US007021472B1

(12) United States Patent
Meurer

(10) Patent No.: US 7,021,472 B1
(45) Date of Patent: Apr. 4, 2006

(54) COLLECTION OF SLUDGE FROM THE FLOOR OF A BASIN WITH MULTIPLE BALANCED-FLOW HEADERS

(75) Inventor: Charles Lonnie Meurer, Golden, CO (US)

(73) Assignee: Meurer Research, Inc., Golden, CO (US)

( * ) Notice: Subject to any disclaimer, the term of this patent is extended or adjusted under 35 U.S.C. 154(b) by 21 days.

(21) Appl. No.: 10/741,655

(22) Filed: Dec. 19, 2003

Related U.S. Application Data

(63) Continuation-in-part of application No. 10/420,570, filed on Apr. 21, 2003.

(51) Int. Cl.
*B01D 21/24* (2006.01)

(52) U.S. Cl. .................. 210/523; 210/527; 210/532.1; 137/98

(58) Field of Classification Search ................ 210/523, 210/525, 527, 532.1, 803; 137/98, 100
See application file for complete search history.

(56) References Cited

U.S. PATENT DOCUMENTS 630,962 A 8/1899 Wood
1,918,742 A 7/1933 Elrod ......................... 210/525
2,646,889 A 7/1953 Dulak ......................... 210/207
3,333,704 A 8/1967 McGivern ................... 210/242
3,353,683 A 11/1967 Geiger ....................... 210/527
3,416,176 A 12/1968 Ravitts ......................... 15/1.7
3,494,462 A 2/1970 Baud .......................... 210/112
3,616,651 A 11/1971 Chang et al. ............... 405/158
3,669,271 A 6/1972 McGivern ................... 210/128
3,707,737 A 1/1973 Brower ......................... 15/1.7
4,090,966 A 5/1978 Clendenen .................. 210/143
4,193,871 A 3/1980 White et al. ................ 210/525
4,401,576 A 8/1983 Meurer ....................... 210/803
4,477,939 A 10/1984 White et al. .............. 15/246.5
4,514,303 A 4/1985 Moore ........................ 210/519
4,551,246 A 11/1985 Coffing ....................... 210/221
4,555,340 A 11/1985 Boyle ......................... 210/248
5,366,638 A 11/1994 Moore ........................ 210/802
6,234,323 B1 * 5/2001 Sarrouh ...................... 210/523
6,497,249 B1 * 12/2002 Swan et al. ................. 210/527

FOREIGN PATENT DOCUMENTS

GB 742315 12/1955

* cited by examiner

*Primary Examiner*—Christopher Upton
(74) *Attorney, Agent, or Firm*—C. E. Martine, Jr.

(57) ABSTRACT

A system meets needs in material collection by significantly increasing the flow rate through a header that collects sludge without causing problems in priming. Telescopic pipes stay in a line adjacent to the bottom of a basin and do not float upwardly into or against equipment in the basin. A flow controller is positioned adjacent to an inlet end of one of the telescopic pipes to balance the flow of the sludge into the inlet end from headers on the other pipe.

30 Claims, 14 Drawing Sheets

COLLECTION OF SLUDGE FROM THE FLOOR OF A BASIN WITH MULTIPLE BALANCED-FLOW HEADERS

CROSS REFERENCE TO RELATED APPLICATION

This application is a continuation-in-part of co-pending application Ser. No. 10/420,570 filed Apr. 21, 2003 for "Apparatus For Collecting Sludge From The Floor Of A Settler Basin" (the "parent application"), priority from which parent application is claimed under 35 USC Section 120, the disclosure of which parent application is incorporated by reference.

FIELD OF THE INVENTION

The present invention relates to the collection of materials from liquids, and more particularly to a telescopic pipe arrangement and collection process for carrying multiple balanced-flow sludge collector headers in a material collection basin.

BACKGROUND OF THE INVENTION

In the past, containers (e.g., basins or tanks) have been provided to house apparatus in which materials are collected. For example, materials may be collected from liquids by plate or tube settlers that promote settling of the material to the bottom of the basin. In other cases, flocculators may be housed in such containers, and materials often inadvertently move in the flocculators to the bottom of the basin. Because the flocculators are designed to circulate the liquid and materials, rather than promoting settling of the materials, the materials that inadvertently collect at the bottom of the basin present a problem. In both cases, the materials on the bottom may be referred to as "sludge".

In the case of the settlers, for example, the sludge is collected, or removed, from the bottom to make room for more materials as more liquid and materials flow into the basin. In the past, sludge collection equipment has been mounted on or near the bottom for gathering the sludge and flowing the sludge out of the basins. Such equipment has included a so-called header pipe (e.g., a hollow tube) mounted for movement along a path adjacent to the bottom. The header pipe is below the settler plates of a settler, for example. Low pressure has been applied to the header pipe as the header pipe moves along the path. Holes in the pipe admit the sludge and liquid from the bottom of the basin. The holes may be of the type described in U.S. Pat. No. 5,914,049, issued on Jun. 22, 1999, and entitled "Method and Apparatus For Helical Flow In Header Conduit", the disclosure of which is incorporated by reference. Under the action of the low pressure, the sludge and the liquid flow into and through the header pipe, and from the header pipe through a flexible outlet hose to a discharge location out of the basin.

The low pressure has been applied to the header pipe by the flexible outlet hose. Such hoses have generally been small diameter hoses, e.g., not exceeding four inches in diameter. Also, the flexible hoses are typically ribbed on the inside, which restricts the inside diameter and increases head loss. Generally, such small diameter hoses can only induce a maximum flow rate of about 200 gallons per minute (gpm) in the header pipe. Thus, the flow rate through the header pipe has been limited by the flow capacity of the flexible outlet hoses.

An unacceptable solution to this flow rate problem is to use many of the flexible hoses. That solution is unacceptable because the flexible outlet hoses can flex. Each flexible hose is thus free to rise (i.e., float) above the header pipe under buoyancy forces of gases in the flexible outlet hose. As a result, the flexible hoses have in the past risen above the header pipe and a portion of each flexible hose has assumed an inverted U-shape. Unfortunately, because the U-shaped portion is above the level of the header pipe, and is above the level of an outlet of the flexible hose from the basin, the gas becomes trapped in such inverted U-shaped portion, making it difficult to prime the hose when starting the sludge collecting operation. When many flexible hoses are used to provide more flow rate from the header, the priming problem is increased.

Also, because the flexible outlet hoses tend to float, these hoses tend to interfere with the operation of the settlers, which extend downwardly in the basin toward the bottom and provide a low-clearance situation at the bottom of the basin. A similar problem would exist with attempts to use such hoses to remove the material from beneath the flocculators.

The invention described in the parent application overcame all of the above limitations of the described prior systems, by providing a way of significantly increasing the flow rate through a header pipe that collects material from the bottom without causing the problems in priming the sludge collection system. That invention also provided a way of achieving such sludge collection, while having an easily primed collection system, and provided the entire sludge collecting system in the low-clearance space under the settler and flocculating equipment that extends down near the bottom of the basin.

In the invention of the parent application, the way of significantly increasing the flow rate through the one header pipe that collects material from the bottom was by using a larger-diameter pipe assembly connected to the header pipe. The way of avoiding problems in priming the sludge collection system was by making the larger-diameter pipe assembly rigid so that it was not free to rise (float) above the level of the header pipe in the basin, or the outlet of the pipe assembly, which is near the bottom of the basin. The way of achieving such sludge collection, while having an easily primed collection system, and providing the entire sludge collecting system in the low-clearance space under the settler and flocculating equipment that extends down near the bottom of the basin, was to mount the larger-diameter, rigid pipe assembly directly adjacent to the bottom of the basin, e.g., along the path normally taken by the header pipe as it traverses the bottom of the basin. That way of achieving these features, while still allowing the sludge collecting system to traverse the header from one end of the basin to the opposite end of the basin, was by making the larger-diameter rigid pipe assembly telescopic, that is, in two parts that have a telescopic relationship. In this manner, one telescopic pipe was secured to the basin, as by being held in place as it extends through an end wall of the basin to a sludge outlet outside the basin. Such fixed pipe was a pipe having a diameter larger than the small (e.g., maximum of four inches) prior flexible hoses described above. The other telescopic pipe was somewhat larger (e.g., about two inches larger) than the fixed pipe so as to receive the fixed pipe and permit relative movement between the two telescopic pipes. The fixed pipe was called the inner telescopic pipe and the other telescopic pipe was called the outer, or movable, telescopic pipe.

The movable outer pipe of the parent application was configured to carry a plurality of the headers, and was moved by a low-profile cable drive relative to the bottom of the basin and between the end walls of the basin to present the headers to the sludge that accumulates on the bottom of the basin awaiting collection. The use of many such headers on the telescopic arrangement provided the advantage, for example, of allowing collection of the sludge simultaneously from many locations along the floor of the basin. However, Applicant's further studies of the flow characteristics of such plurality of headers indicated that it is desirable to provide additional benefits using the two telescopic pipes of the parent application. For example, during the use of more than one header on the two telescopic pipe arrangement, and without having moving parts in addition to the movement of the one pipe relative to the other pipe, there should be a way to assure a balanced flow of sludge and liquid through both header pipes. Also, again without having such moving parts, such studies indicated that it would be desirable to provide a way of obtaining a higher ratio of sludge to liquid collected by the telescopic arrangement. Further, such studies indicated that it would be desirable to provide a way to avoid sludge build-up near one end of the basin as compared to the sludge near the other end, by uniformly removing the sludge from across the area of the bottom of the basin.

What is needed then is a way to achieve the advantages of the telescopic pipe arrangement of the parent application, and to have the additional advantages of allowing collection of the sludge simultaneously from many locations along the floor of the basin, and, without having moving parts in addition to the movement of the one pipe relative to the other pipe, to provide a way to assure a balanced flow of sludge and liquid through both header pipes. Also, again without having such moving parts, what is needed is to provide a way of obtaining a higher ratio of sludge to liquid collected by the telescopic arrangement. Further, what is needed is to provide a way to avoid sludge build-up near one end of the basin as compared to the sludge near the other end.

SUMMARY OF THE INVENTION

Briefly, the present invention meets all of the above needs by providing a way of retaining the advantages of the telescopic pipe arrangement of the parent application, and having the additional advantages of allowing collection of the sludge simultaneously from many locations along the floor of the basin, and, without having moving parts in addition to the movement of the one pipe relative to the other pipe, providing a way to assure a balanced flow of sludge and liquid through both header pipes. Also, again without having such moving parts, the present invention provides a way of obtaining a higher ratio of sludge to liquid collected by the telescopic arrangement. Further, again without having such moving parts, the present invention provides a way to avoid sludge build-up near one end of the basin as compared to the sludge near the other end.

The way the present invention meets all of the above needs while retaining the advantages of the telescopic pipe arrangement of the parent application, and while having the additional advantages of allowing collection of the sludge simultaneously from many locations along the floor of the basin, and without having such moving parts, is to provide a collection process with a flow balancer, or controller, mounted on the inner pipe of the two pipes in the telescopic pipe arrangement of the parent application. The flow that is balanced is the combined flow of the sludge and liquid that enters each of the headers, and the balancing renders such flow through one of the headers relatively the same as the flow through the other of the headers. One aspect of the balanced flow relates to configuring the flow balancer relative to the inner diameter of the outer pipe of the two pipes in the telescopic pipe arrangement of the parent application, such as by selecting a size (e.g., a diameter) of the flow balancer. Another aspect relates to configuring the flow balancer to be in the outer pipe and selectably positioned relative to an entrance end of the inner pipe. A still other aspect of the balanced flow relates to configuring the flow balancer with an inlet orifice for admitting and controlling the flow from one of the headers, wherein the controlled flow is directed into the inlet end of the inner pipe. As a result of such configuring, without having such moving parts, the present invention may provide a way of obtaining a higher ratio of sludge to liquid collected by the telescopic arrangement. Without having such moving parts, the balanced flow of the present invention reduces sludge build-up near one end of the basin as compared to the sludge near the other end.

A further aspect of the present invention is to provide a system and process for collecting material (e.g., sludge), in which a first (e.g., outer) rigid pipe and a second (e.g., inner) rigid pipe each define a conduit. The first and second pipes are in telescopic relationship, one received within the other. At least two headers may be secured to the outer one of the rigid pipes and each generally has openings through which to collect the sludge. The headers define header conduits extending from the header openings to the conduit of the outer rigid pipe to carry the sludge through an entrance inlet of and into the second rigid pipe, which is within the first rigid pipe. A flow balancer is received in the outer pipe and secured adjacent to the entrance end of the second pipe. The flow balancer adjusts the flow of the sludge and liquid entering the inner pipe from a first of the headers. The adjustment is relative to a flow of the sludge and liquid through the other one of the headers, and renders such flows more equal.

Yet another aspect of the present invention is to provide the system and process for collecting material in a basin configured with a bottom to contain the material. The outer pipe and the inner pipe are supported on the bottom of the basin. The outer pipe is the one of the pipes to which the headers are secured, the inner pipe is the one pipe received in the other pipe. The inner pipe is secured to the basin. The outer pipe is movable relative to the basin and relative to the inner pipe so that the material collection conduit is extendable and retractable as the outer pipe moves relative to the basin. The extendable and retractable material collection conduit carries collected material from the header opening of each of the headers to the first conduit of the outer pipe and through an entrance inlet and into the second conduit of the inner pipe. To render the flow balanced, so that the flow from one header through the entrance inlet is substantially the same as the flow from the other header through the entrance inlet, a flow balancer member is secured to the inner pipe adjacent to the entrance inlet. In one embodiment, the flow balancer member is a single member secured to the inner pipe so as to be selectably positionable relative to the entrance inlet of the inner pipe. In another embodiment, the single flow balancer member is configured with an inlet orifice through which the sludge and liquid flows from the one header. In yet another embodiment, the flow balancer member is a ring having the inlet orifice, and is mounted with a solid disk so that the sludge and liquid flow around the disk and around the single member and then into the entrance inlet of the inner pipe. In these embodiments, head loss in the flow from one of the headers to the disk and inlet orifice tends to balance the flows into the headers.

Still another aspect of the present invention is to provide the system and process for collecting material in a basin having a bottom for supporting the material, the basin being configured with equipment that provides the material supported on the bottom. The equipment may be configured in a position relative to the bottom to provide low-clearance height between the bottom and a lower portion of the equipment. The system may include a low-profile apparatus for collecting the material from the bottom of the basin. The low-profile apparatus includes a first, or outer, rigid pipe. The first rigid pipe defines a first conduit. A second, or inner, rigid pipe defines a second conduit. The first and second pipes are in telescopic relationship, with the second pipe being received within the first pipe so that the first and second conduits of the pipes cooperate to define a material collection conduit. The material collection conduit extends generally parallel to the bottom of the basin and in the low-clearance height between the equipment and the bottom. One or more headers are secured to the first pipe. The headers have openings through which to collect the material. Each header defines a header conduit extending from the openings to the respective conduits of the rigid pipes to carry the material and liquid to the material collection conduit. Flow of the material and liquid into each header is balanced by a flow controller attached to the inner rigid pipe. With both the flow controller and the inner pipe received in the first pipe, the flow controller does not extend into the low-clearance height between the bottom of the basin and the lower portion of the equipment. As a result, the flow controller does not interfere with the operation of the equipment.

Other aspects and advantages of the present invention will become apparent from the following detailed descriptions, taken in conjunction with the accompanying drawings, illustrating by way of example, the principles of the present invention.

BRIEF DESCRIPTION OF THE DRAWINGS

The present invention will be readily understood by the following detailed description in conjunction with the accompanying drawings, wherein like reference numerals designate like structural elements or operations.

DETAILED DESCRIPTION OF THE PREFERRED EMBODIMENTS

An invention is described for significantly increasing the flow rate through header pipes that collect sludge and liquid from the bottom of a basin, without causing the above-described problems in priming a sludge collection system, while balancing flows from separate headers that collect the sludge and liquid from the bottom. Telescopic pipe structures provide a way of achieving such sludge collection, while having an easily primed collection system, and providing the entire sludge collecting system in a low-clearance space under the settler and flocculating equipment that extends down near the bottom of the basin, wherein an inner pipe of the pipe structures carries a flow controller to achieve the balancing.

In the following description, numerous specific details are set forth in order to provide a thorough understanding of the present invention. It will be understood, however, to one skilled in the art, that the present invention may be practiced without some or all of those details. In other instances, well known operations and structure have not been described in detail in order to not obscure the present invention.

Figure 1A:
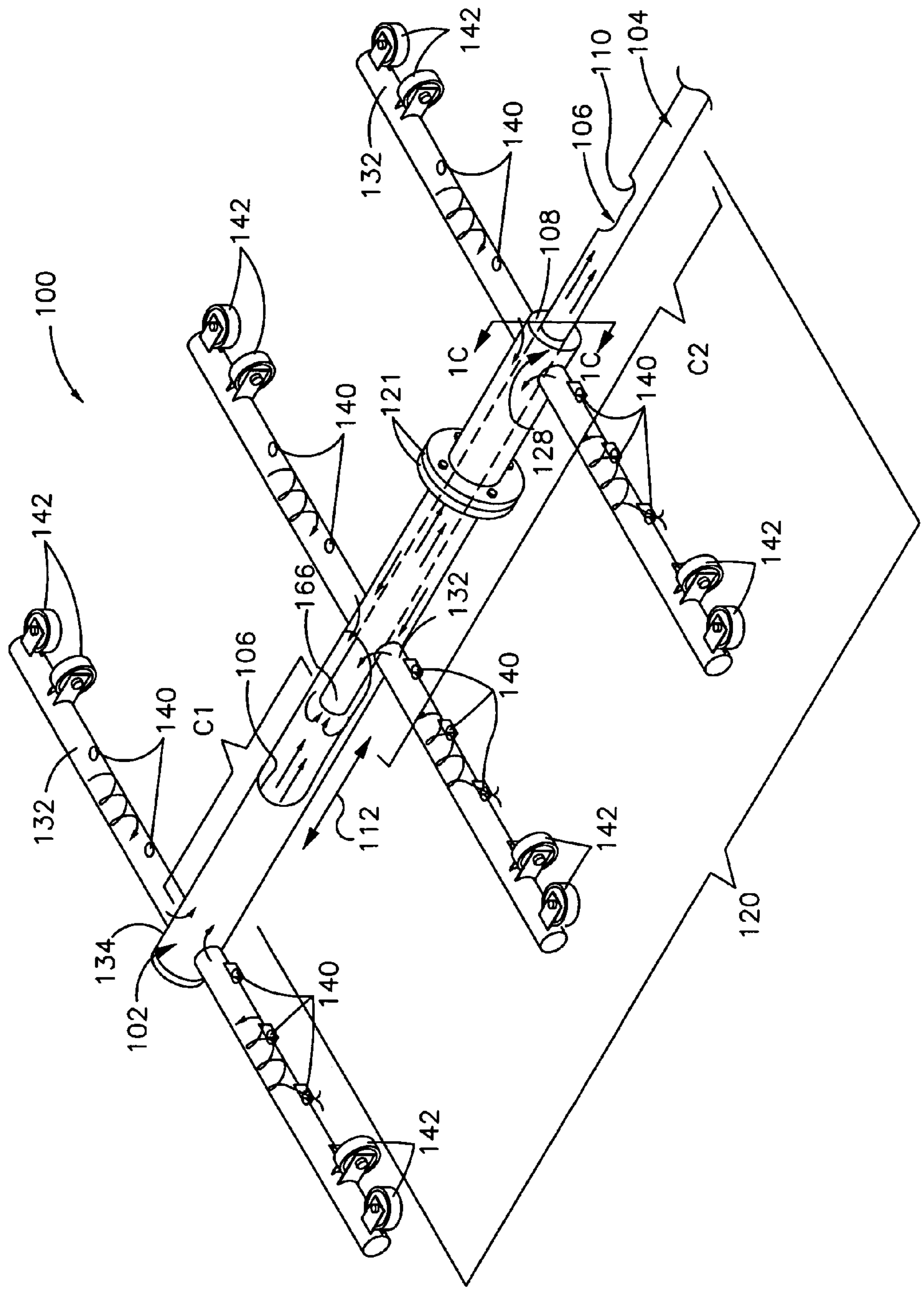
FIG. 1A is a perspective view illustrating a system of the present invention for collecting material.

Referring now to the drawings, FIG. 1A illustrates a system 100 of the present invention for collecting material. The material may initially be in, or mixed with, a liquid, such as water or water-like fluids typically found in settlers, flocculators or other liquid treatment plants. For example, the material may be the above-referenced material collected from liquids in plate or tube settlers that promote settling of the material to the bottom of the basin. The settlers may be fabricated according to U.S. Pat. No. 5,391,306, issued Jun. 21, 1995, and entitled "Settler With Preset Outlet Area Deck and Variable Angle Removable Lamina and Method of Using Settler", in which setter plates are movable, for example, and the disclosure of such Patent is incorporated herein by this reference. Additionally, the material may inadvertently move from the flocculators to the bottom of the basin. Whether the materials are from settlers, or flocculators, or from other sources or equipment, the collected materials may be referred to as sludge, and are collected with the liquid. The combined collected sludge and liquid are referred to together as "collectant", and reference is made to the ratio of the collected sludge to the collected liquid. It is desired that this ratio be large so that a high amount of sludge is contained in a given volume of collectant.

In the system, a first rigid pipe 102 and a second rigid pipe 104 each define a conduit 106. The pipes 102 and 104 are configured to be rigid, as compared to the above-described flexible hoses that are light and tend to bend and allow floatation, as described above. Thus, the rigid pipes 102 and 104 do not bend easily, if at all, and are not subject to the above-noted problems of the flexible hoses. For ease of description, the first rigid pipe 102 and the second rigid pipe 104 may be referred to as "pipes", without referencing the rigidity, but in each case the rigid characteristic (or property)

is provided. To achieve such rigidity, the pipes 102 and 104 are preferably made from plastic such as polyethylene (PE), polyvinylchloride (PVC), or acrylonitrile butadene styrene (ABS), for example. To provide more weight per unit length, and thus more resistance to floatation, the pipes 102 and 104 may be made from metal. In a most preferred embodiment, the pipes 102 and 104 may be made from stainless steel. The metal pipes 102 and 104 have the most weight per unit length and thus resist floatation more than the plastic pipes which have neutral buoyancy. The rigid pipes also have smooth insides, and without the bends of the flexible hoses are straight and cause less head loss than the flexible hoses.

The second pipe 104 may be referred to as an inner pipe in that it is received partially or entirely inside the first pipe 102 in a telescopic relationship. The first pipe 102 may be referred to as the outer, or header mount, pipe. To provide adequate flow of the collected materials and liquid, the inner pipe 104 may be configured with a nominal (inside) diameter of from 3 inches to 12 inches, for example. The outer pipe 102 may be configured with a nominal diameter that is about 2 inches greater than that of the inner pipe 104 when the inner pipe has the 3 inch nominal diameter, for example. The outer pipe 102 may be configured with a nominal diameter that is about 4 inches greater than that of the inner pipe 104 when the inner pipe has the 12 inch nominal diameter, for example. The larger diameter of the outer pipe 102 provides a radial clearance of about 1 to 2 inches between a wall 108 of the outer pipe 102 and a wall 110 of the inner pipe 104. According to the diameters selected for flow rate purposes, the pipes 102 and 104 may have a respective wall 108 and 110 that is thin, such as a wall thickness of about 0.083 to about 0.125 inches. Such adequate flow may be in a range of from about 20 gpm (corresponding to the 3 inch diameter inner pipe 104) to about 2000 gpm (corresponding to the 12 inch nominal diameter inner pipe 104 and 16 inch nominal diameter outer pipe 102). It may thus be understood that the rigid inner pipe 104 may be sized to provide a substantially greater flow rate than the maximum 200 gpm flow rate generally provided by the flexible hose that is subject to the priming problems described above.

FIG. 1A shows that the first and second pipes 102 and 104 are in the telescopic relationship, the inner pipe 104 being received partially or fully within the outer pipe 102, with the pipes 102 and 104 in coaxial relationship. The telescopic relationship is also one in which the pipes 102 and 104 are free to move in an axial direction (see arrow 112) relative to each other so that the longest combined, or extended, length of the pipes (see LE in FIG. 2B) is about the sum of each separate length of each pipe 102 and 104. The length LE also corresponds to an extended position of the pipes 102 and 104. In the extended position, the outer pipe 102 overlaps the inner pipes 104 by about four to six inches, for example. The axial direction 112 of relative movement also allows the pipes 102 and 104 to move so that the inner pipe 104 may be almost fully received within the outer pipe 102, and the combined, or collapsed, length (see LC in FIG. 2A) of the pipes 102 and 104 is the value of the longer of the two pipes. The length LC also corresponds to a collapsed position of the pipes 102 and 104. In this manner, the conduits 106 of the pipes 102 and 104 cooperate to define a material collection conduit 120 that has a variable length.

The length of each separate one of the pipes 102 and 104 is generally the same, and may range from about 20 feet to about 100 feet, which length depends on factors described below. The telescopic relationship between the two pipes 102 and 104 is illustrated in FIG. 1A, which shows one part (see C1) of the material collection conduit 120 configured from the conduit 106 of the outer pipe 102 when the inner pipe 104 is only partially within the outer pipe 102. FIG. 1A shows a second part (see C2) of the material collection conduit 120 configured from the conduit 106 of the inner pipe 104 when the inner pipe 104 is only partially within the outer pipe 102. Part C2 is shown extending partially within and then to the right of the first pipe 102 as shown in FIG. 1A. The conduit 106 of the inner pipe 104 has the lesser diameter of the two pipes 102 and 104, and must be sized to provide the desired flow rate of the collectant. In a different sense, it may be understood that the approximate maximum 16 inch nominal diameter of the telescoped pipes 102 and 104 and other factors of the present invention may provide a maximum vertical dimension DM (FIG. 3A) of about two feet. This maximum vertical dimension DM is referred to as a low profile, wherein "low" designates a value less than a clearance, or height distance, H (FIG. 3A) described hereinbelow. This low profile also takes into consideration another factor, namely that the outer pipe 102 may be provided and configured as shown in FIG. 1B with an assembly of short pipes that are connected by flanges 121, for example, such that the flanges 121 are within the low profile.

Figure 1B:
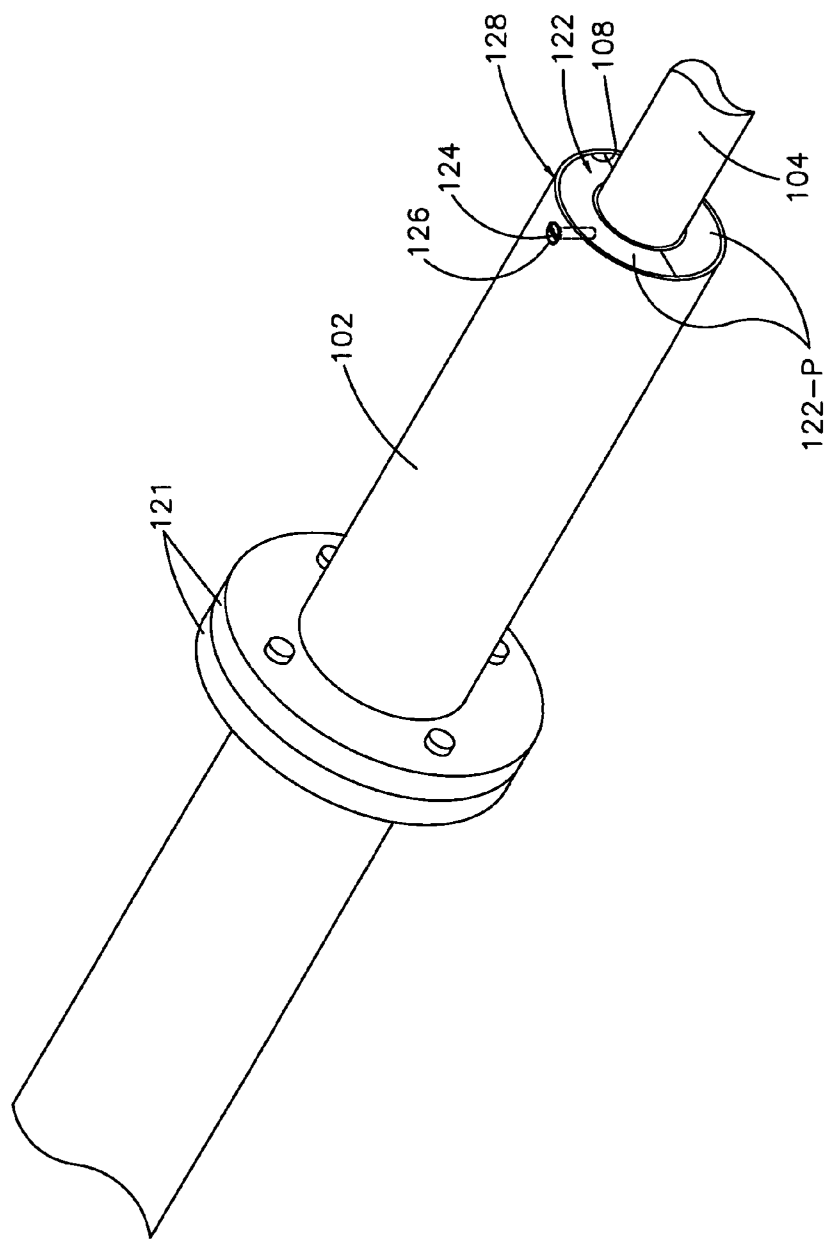
FIG. 1B is a perspective view illustrating a portion of the system shown in FIG. 1A, wherein flanges on an outer pipe are shown.
Figure 1C:
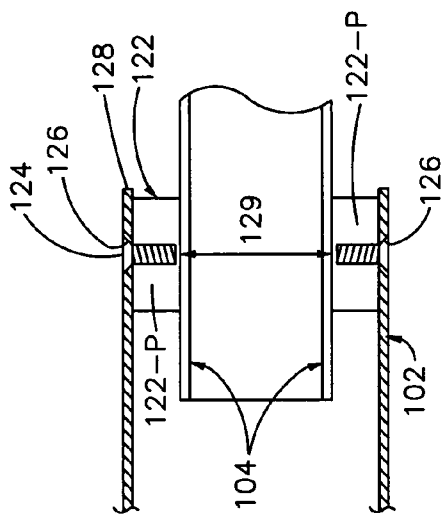
FIG. 1C is a cross sectional view taken along line 1C—1C in FIG. 1A, illustrating the insides of telescopic pipes of the system shown in FIG. 1A.

FIGS. 1B and 1C show a seal 122 in the outer pipe 102. For clarity of illustration, the seal 122 is not shown in FIG. 1A. The seal 122 has properties of a bearing, and may be configured from polymer. Thus, the seal 122 may also be referred to as a bearing, and is configured to be mounted over the inner pipe 104. In one embodiment of the seal 122, two C-shaped seal pieces 122-P are provided. The C-shaped pieces 122-P are placed together to define a thick circle, or annular-shaped, or donut-shaped, configuration. A fastener 124 such as a screw, extends through each of two holes 126 adjacent to a seal end 128 of the outer pipe 102. The screws 124 extend through the holes 126 and into the respective C-shaped piece 122-P to retain the respective one of the C-shaped seal pieces 122-P adjacent to such seal end 128 and with the annular-shaped seal 122 mounted over the inner pipe 104. The annular, or donut, -shaped configuration of the seal 122 provides an access hole 129 in which to receive the inner pipe 104. The outer diameter of the seal 122 is configured to be about equal to, or somewhat less than, the outer diameter of the outer pipe 102, which as noted above is selected according to the diameter of the inner pipe 104.

Referring to FIGS. 1A–1C, with this configuration, and with the seal 122 fixed to the outer pipe 102, during relative movement between the inner pipe 104 and outer pipe 102 the seal 122 may rub tightly against the outside of the inner pipe 104 to perform a sealing function. With the pipes 102 and 104 operated at low pressure, the seal 122 reduces the flow of the material into the material collection conduit from other than headers 132 provided with header openings 140. Because the header openings 140 are spaced across a width (not shown) of the basin 150 (FIG. 2A), the seals 122 promote sludge collection across the width of the basin 150. While the seal 122 rubs against the inner pipe 104 in this manner, the seal 122 also permits the relative movement between the pipes 102 and 104 in the telescopic relationship. In detail, the seal 122 allows the outer pipe 102 to be moved relative the inner pipe 104 in a movement (see arrow 112, FIG. 1A) referred to as traversing of the outer pipe 102.

The traversing of the outer pipe 102 facilitates similar traversing of one or more of the headers 132 that are secured to the outer rigid pipe 102. FIG. 1A shows three such headers 132, and shows an end 134 of the outer pipe 102 that is closed to facilitate operation of the headers 132. However, more than one header 132 may be provided between one of the headers 132 that is near the left end 134 and another one of headers 132 that is near the seal end 128 of the outer pipe 102, so that the desired flow rate of material and liquid (e.g., sludge) is achieved. Each header 132 is a hollow member such as a pipe or conduit. An exemplary plurality of headers 132 is shown in FIG. 1A, as three headers, each being secured to the outer pipe on opposites sides of the outer pipe 102. Each of the headers 132 may be configured according to U.S. Pat. No. 5,914,049. Such configuration includes material and liquid inlet, or header, openings 140 that facilitate collection of the material and liquid with the material. In terms of these openings 140, the seal 122 shown in FIGS. 1A and 1C need only be effective to limit the leakage of the sludge and liquid into the material collection conduit 120 through the seal 122 (rather than having all the flow be through the openings 140) to a flow about equal to the flow into one or two of these openings 140. Opposite ends of each header 132 are closed, and the end that is secured to the outer pipe 102 is open to permit the material and liquid to enter the outer pipe 102. The headers 132 are also provided with rollers 142 which guide the headers 132 and the pipes 102 and 104 as described below.

To provide adequate flow of the collected materials and liquid, the headers 132 may be configured with various nominal (inside) diameters, which are selected according to the desired flow rate through the material collection conduit 120, and in particular through the part C2 of the inner pipe 104. For example, the inner pipe 104 may have a nominal diameter of about four inches and the outer pipe 102 a nominal diameter of about six inches, for example, and two headers 132 may be provided. Each header 132 may have a three inch nominal diameter. With suitably sized material and liquid collection openings 140 in the two headers 132, this configuration will provide a flow rate of about 250 gpm through the inner conduit 104. This example shows that the present invention may provide substantially more flow rate (i.e., 250 gpm) using the same nominal (four inch) diameter of the inner pipe 102 as the maximum diameter four inch nominal diameter flexible prior art hose that has the maximum 200 gpm flow rate and more head loss.

Figure 2A:
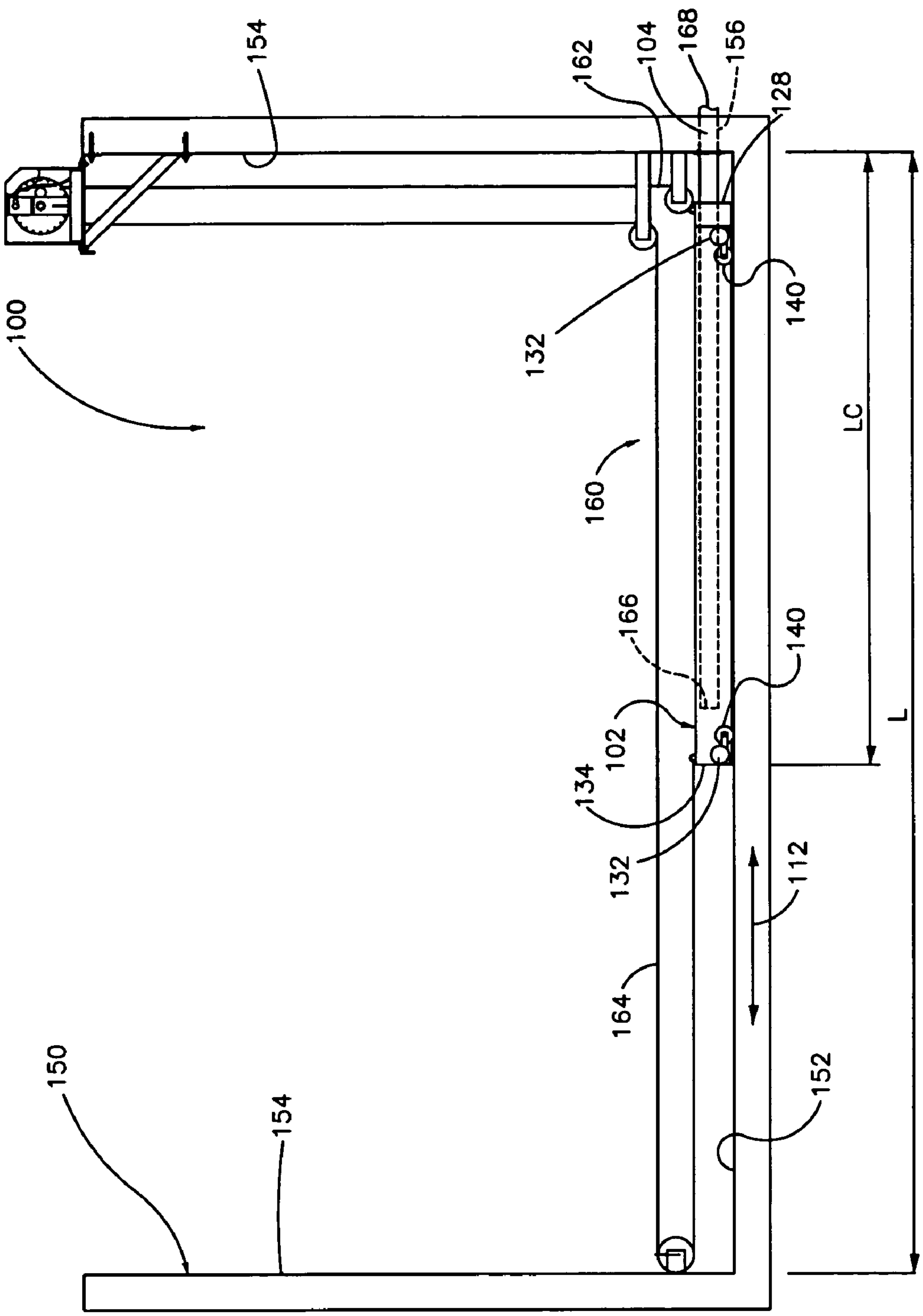
FIGS. 2A and 2B are elevational views showing the system installed in a container, which is typically referred to as a basin, and an outlet end of an inner pipe.

FIG. 2A shows one of the systems 100 installed in a container, which is typically referred to as a basin 150. Details not essential to the system 100 are not shown, but it may be understood that the liquid and materials enter the basin 150, and, depending on the type of basin 150, the materials in some manner make their way to a floor, or bottom, 152 of the basin 150. For clarity of description, the materials and liquid are not shown. When the materials accumulate on the bottom 152, the system 100 serves to collect them and guide them from the basin 150. The basin 150 is provided with opposite end walls 154. An end wall 154 on the exemplary right of the basin 150 is provided with an outlet hole 156 that receives the inner pipe 104 of the system 100. The inner pipe 104 is secured to the right wall 154, as by a coupler or fitting, such that the inner pipe 104 is fixed to the end wall 154. The hole 156 is adjacent to the bottom 152 so that the axial direction (arrow 112) extends close to, and parallel to, the bottom 152. The basin 150 is shown with a length L between the end walls 154. The length of the inner pipe 104 in the basin 150 has a value of about ½ L as shown in FIG. 2A. The system 100 is also shown with the outer pipe 102 in the above-described telescopic relationship with the inner pipe 104. Thus, the outer pipe 102 extends over the inner pipe 104. The rollers 142 shown in FIG. 1A engage the side walls (not shown) and bottom 152 of the basin, roll through the sludge, and keep the bottom of the outer pipe 102 an exemplary few inches above the bottom 152. The outer pipe 102 is shown with an exemplary two headers 132, and the headers 132 collectively extend across a width (not shown) between the side walls of the basin 150.

In FIG. 2A the outer header 102 is shown in the collapsed position, fully on (or covering) the inner pipe 104, in contrast to the position shown in FIG. 1A. In this collapsed position, the rightward header (referred to as 132-1) is adjacent to the right end wall 154 and the leftward header (referred to as 132-2) is in the middle of the basin (between the end walls 154). A cable drive 160 is provided to move the outer pipe 102 in the above-described traversing movement relative to the inner pipe 104. The cable drive 160 may include a first cable 162 connected to the right (outlet) end 128 of the outer pipe 102, and a second cable 164 connected to the left end 134 of the outer pipe 102. The cables 162 and 164 are alternately moved left and right by a shared-reel drive described in U.S. Pat. No. 5,655,727, issued on Aug. 12, 1997, and entitled "Sludge Collector Method and Drive With Shared Reel For Taking Up and Paying Out Cables", the disclosure of which is incorporated by reference. The cable drive 160 moves the outer pipe 102 to the left from the collapsed position shown in FIG. 2A to the extended position shown in FIG. 2B. The rollers 142 again roll over the floor 152 and against the side walls, and the headers 132 move through and into the sludge that is on the floor 152.

Figure 2B:
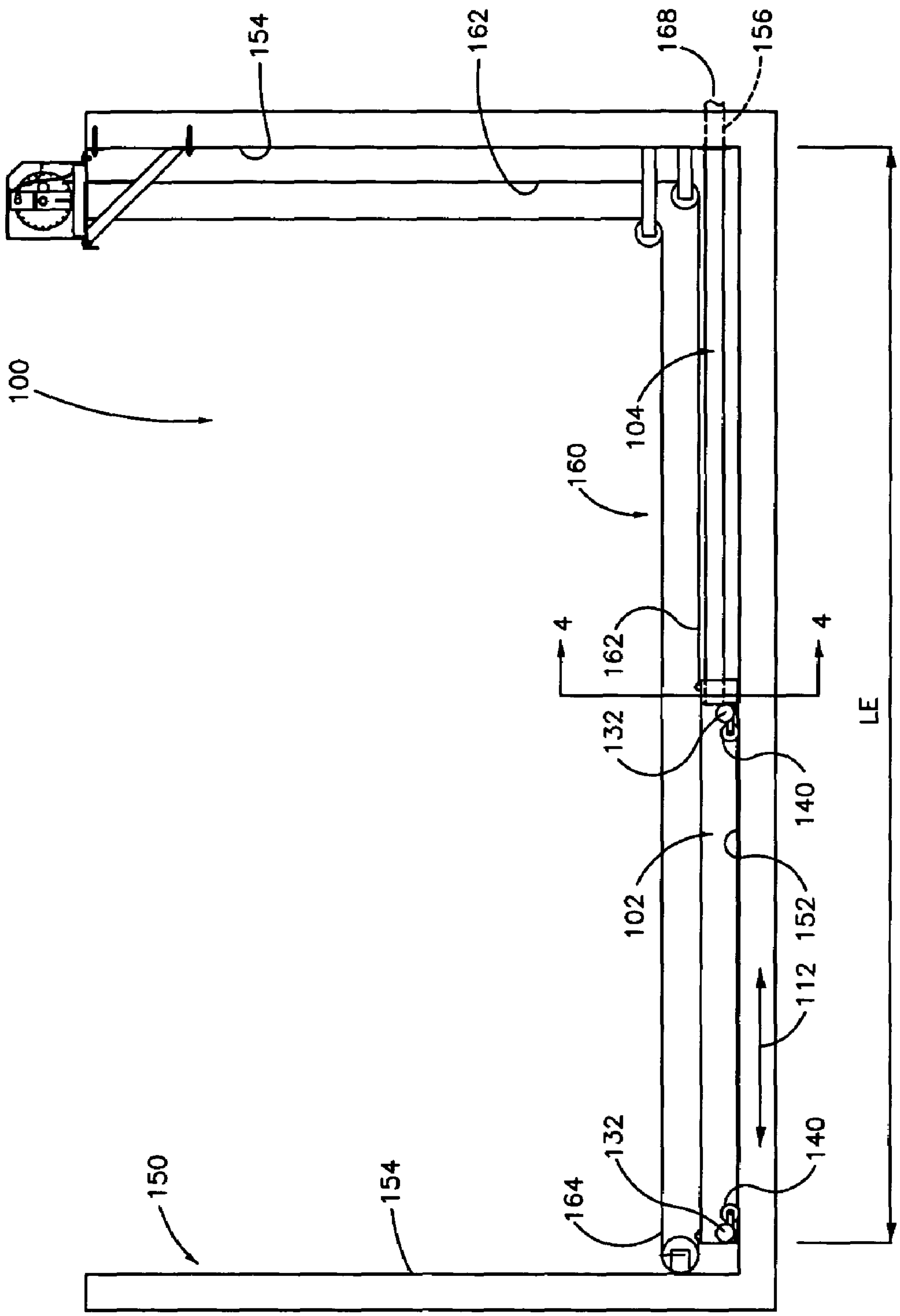

FIG. 2B shows the outlet end 168 of the inner pipe 104 extending outside the basin 150. The outlet end 168 is connected to a valve and vacuum pump (not shown). The pump causes a low pressure to be applied to the outlet end 168 of the inner pipe 104. That low pressure causes a low pressure in the material collection conduit 120 defined by the pipes 102 and 104, so that the sludge and liquid are caused to flow into the openings 140 in the headers 132 as the outer pipe 102 is traversed. According to the U.S. Pat. No. 5,914,049 identified above, the sludge and liquid enter the headers 132 at a tangent and assume a helical flow path toward the outer pipe 102. The sludge and liquid enter and flow through the outer pipe 102, and then enter and flow through the inner pipe 104 to the outlet end 168 of the inner pipe 104. The sludge and liquid flows past the control valve (not shown) and to other conduits outside the basin 150 for collection and draining of the liquid to form dry sludge. When the outer pipe 102 reaches the left end wall 154 of the basin 150, the cable drive 160 reverses and the outer pipe 102 is traversed to the right and to the fully collapsed position shown in FIG. 2A. The reversing and opposite traversal alternate through many cycles of collecting the sludge and the liquid.

Figure 3:
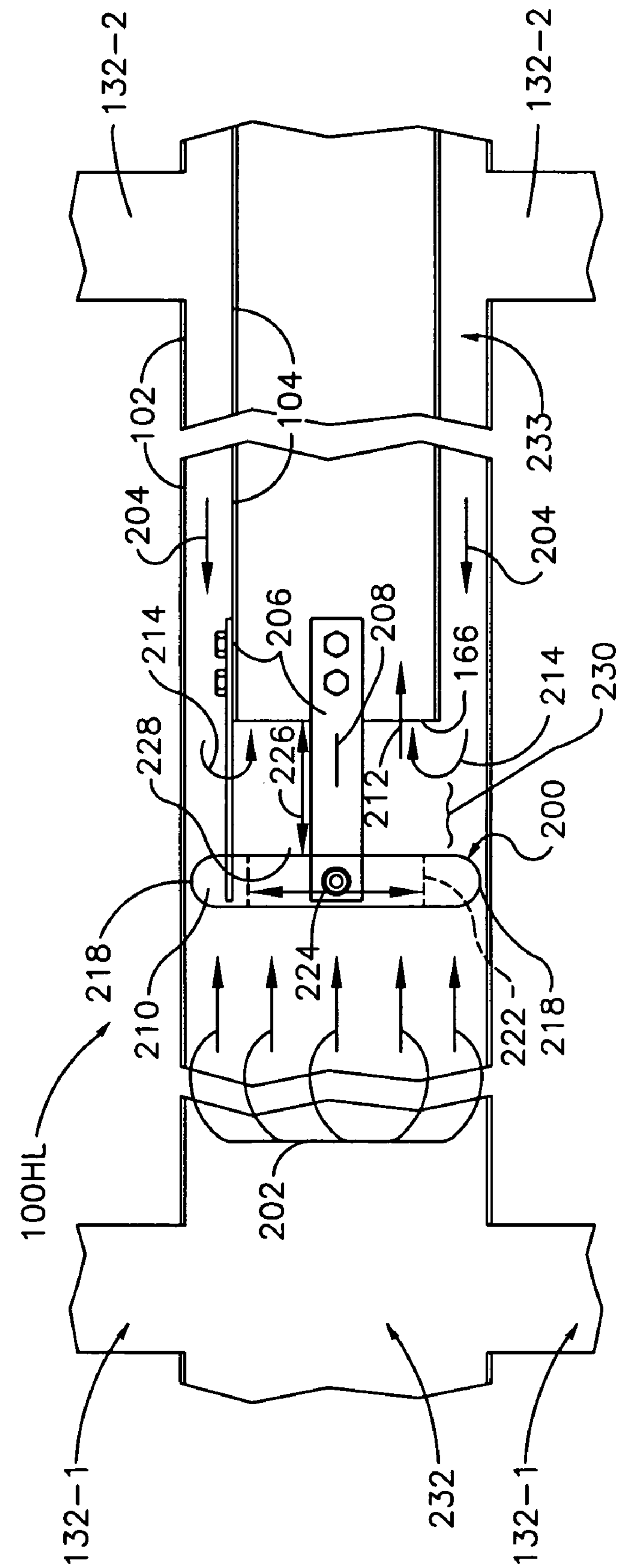
FIG. 3 shows an enlarged elevational view of one embodiment of the present invention illustrating a flow control member, or ring, located in the outer, or header mount, pipe adjacent to an inlet end of the inner pipe.

FIG. 3 shows an enlarged elevational view of another embodiment of the system 100 of the present invention in which a member 200 is located in the outer (header mount) pipe 102 adjacent to the inlet end 166. This embodiment 100 is referred to as "100HL" to identify a head loss described below and resulting from the member 200. The member 200 is positioned in a first path (see arrows 202) of the collectant that flows in the outer pipe 102 from the first of the headers 132-1. The member 200 is also positioned in a second path (see arrow 204) of the collectant flowing in the outer pipe 102 from the second of the headers 132-2. FIG. 3 shows that at least one arm 206 is supported on the inner pipe 104 adjacent to the inlet end 166. The supporting may be by being bolted to the end 166, for example. In FIG. 3, two of an exemplary three arms 206 are shown, and are spaced around the inlet end 166 at 90 degree intervals, for example.

The following description of one arm 206 applies to each such arm 206, whether two or three or more such arms are used. Each arm 206 extends from the inlet end 166 in a direction (see line 208) of an axis of each of the inner pipe 102 and the outer pipe 104. In this manner, each arm 206 is cantilevered from the inlet end 166 of the inner pipe and extends past the inlet end 166.

FIG. 3 also shows an embodiment of the member 200 configured as a flow balancing ring 210 that is carried by the arms 206. The ring 210 is configured to extend perpendicular to the direction 208 of the axis of the pipes 102 and 104. In a general sense, the ring 210 causes a head loss in the flow 202 of collectant flowing to the inlet end 166. The head loss results from the ring 210 being in the first path 202 of the flow of the collectant as the collectant flows toward the inlet end 166 of the inner pipe 104 (see arrow 212 indicating flow into the inlet end).

In detail, the inlet end 166 is open. Under the low pressure applied to the pipe 104 at the opposite end 168 of the pipe 104 (FIG. 2B), the collectant is urged to enter the inlet end 166. In the same general sense, the ring 210 also directs the second path 204 (of the flow of the collectant) into the inlet end 166 of the inner pipe 104 (see arrow 212). In this case, because the second path 204 is toward the left in FIG. 3, and the inlet end 166 is open to the right, the directing of the second path 204 by the ring 200 is a redirection of the second path 204, as in a U-turn (see arrow 214), so that the redirected collectant flows into the inlet end 166 of the inner pipe 104 as indicated by the arrow 214. In this manner, the second path 204 does not extend to the left past, or beyond, the ring 210.

It may be understood that FIG. 3 also shows the first path 202 being to the right, an exemplary direction, in the outer pipe 102. The outer pipe 102 has an area perpendicular to the direction 208 of the axis of the pipes 102 and 104. That area of the pipe 102 is significantly larger in value than a value of an area in which the second path 204 flows to the left, which is also an exemplary direction. That area in which the second path 204 flows is between the inner wall of the outer pipe 102 and the outer wall of the inner pipe 104, and is thus an annular area that has a value that is less than (i.e., different from) the area of the outer pipe 102. The difference is the value of the area of the inner pipe 104. As a result, there is a tendency for the amount of collectant in the second path 204 to be substantially less than the amount of collectant in the first path 202. Such tendency results, for example, from less head loss, or loss of pressure, occurring between the first header 132-1 (through only the outer pipe 102) to the inlet end 166, as compared to the head loss, or loss of pressure, between the second header 132-2 (through the smaller area between the outer pipe 102 and the inner pipe 104) to the inlet end 166.

The flow balancing ring 210 is configured to reduce that difference in such head losses along the first path 202 and the second path 204. In another sense, the flow balancing ring 210 serves to balance the flow of collectant along the first path 202 and along the second path 204. Ideally, by the action of the flow balancing ring 210 in achieving such balance, the flow of the collectant from the first header 132-1 along the first path 202 equals the flow of the collectant from the second header 132-2 along the second path 204. In actual practice, by the action of the flow balancing ring 210, the flow of the collectant along the first path 202 may be a maximum of about ten percent (10%) more than the flow of collectant along the second path 204. However, this maximum ten percent difference does not result in a build-up (at the bottom 152 of the basin 150) of objectionable thicknesses of the sludge at one end of the basin as compared to the thickness of the sludge at the other opposite end of the basin 152.

The configuration of the flow balancing ring 210 to so reduce the difference in such head losses along the first path 202 and the second path 204, and to obtain such balancing of the flow of the collectant along the first path 202 and the second path 204, is achieved as follows. The ring 210 may be described as being configured with an annular-shape. The ring 210 is positioned by the arms 206 in the outer pipe 102. By having the annular-shape, the ring 210 is configured to extend substantially fully across a cross-sectional area of the outer pipe 102. In detail, as shown in FIG. 3, the outer surface 218 of the ring 210 is positioned close to (e.g., within about 0.21 inches to about 0.22 inches of) the inner wall of the outer pipe 102. As a result, the portion of the ring 210 between the outer surface 218 and an opening 222, or orifice, in the ring 210 blocks the path 202 and prevents the flow of sludge from going outside of the ring 210. The sludge thus does not flow outwardly around the ring 210.

The ring 210 is further configured with the opening, or orifice, 222 which may be formed by drilling into a disk-like original configuration of the ring 210. Such original disk-like configuration may be a circular plastic (e.g., Ultra High Molecular Weight polyethylene) disk having a thickness of about one inch in the direction 208 of the axis of the pipes 102 and 104, and a diameter of about 5.79 inches. This diameter may be used when the disk 210 is to be received in a six inch nominal outside diameter outer pipe 102, for example. With the opening 222 to be formed as by drilling, a diameter 224 of the opening 222 is selected to permit the collectant from the first header 132-1 in the flow path 202 to be directed to flow through the opening 222 and into the inlet end 166 (see arrow 212). The annular portion of the ring 210 between the outer surface 218 and the opening 222 blocks the path 202, so that the flow in the outer part of the path 202 is redirected through the opening 222 and into the open inlet end, or entrance, 166. The flow in path 202 is thus reduced by the above-described head loss in the outer pipe 102. In practice, with an outer pipe 102 having a six inch diameter, used with an inner pipe 104 having a four inch diameter, a typical diameter of the opening 222 may be about 2.5 inches, and the head loss may be about one psi. Factors that may influence the exact diameter of the opening 222 include, for example, the length L of the basin (e.g., between the walls 154, FIG. 2A), the resulting length (e.g., LC) of the outer pipe 102, and the resulting lengths of the flow paths 202 and 204 from the respective headers 132-1 and 132-2 to the inlet 166 of the inner pipe 104. In this regard, it may be understood that as the length L increases, and as LC increases, the diameter 224 of the opening 222 will be made smaller to achieve the desired balancing.

Another aspect of the configuration of the ring 210 is a value of a length 226 of a space 228 between the inlet end 166 of the inner pipe 104 and the right side of the ring 210. The space 228 provided with the length 226 determines the size of an annular-shaped entry 230 to the space 228. It may be understood that with the ring 210 mounted and configured as described above, the longer the length 226, the greater the size of the annular-shaped entry 230 to the space 228, and the greater the flow of the collectant along the path 204. As a result of such a greater size as compared to the diameter 224 of the opening 222, the flow along the second path 204 is permitted to increase in relation to the flow along the first path 202 (as compared to operation without the ring 210). The flow along the second path 204 may be selected to be about equal to, for example, the flow along the first path 202. The increase in such flow of collectant along the second path 204 by using the ring 210, may be compared to the above-described tendency which, without the ring 210, would cause the flow along the second path 204 to be substantially less than the flow along the path 202, such as about 25 gpm less, for example.

As described above, without the ring 210, there is the tendency for the amount of collectant flowing in the second path 204 to be substantially less than the amount of collectant flowing in the first path 202. This tendency results in the difference between the flow of the collectant along the second path 204 and the first path 202. The desired reduction of the difference between such flows may be achieved by selecting the distance 226, and selecting the diameter of the opening 222 in the ring 210, for example. The larger the diameter 224 of the opening 222, the less the head loss will be reduced from a value that occurs without the ring 210, and the more collectant will flow along the first path 202 into the inlet end 166 as compared to the flow along the second path 204 (and see arrows 214 and 212) into the inlet end 166. Similarly, the longer the length 226 of the space 228, the greater the flow of the collectant along the second path 204 into the inlet end 166 as compared to the flow along the first path 202 into the inlet end 166. The length 226 and the diameter 224 of the opening 222 are determined according to the above factors. In the above example of the ring 210 having the approximate six inch diameter, and the 2.5 inch diameter opening 222, the total nominal flow rate of collectant may be about 250 gpm from the outlet end 168, for example, and the nominal flow rate out of the first of the two headers 132-1 (into the outer pipe 102) may be about 125 gpm, and the nominal flow rate out of the second of the two headers 132-2 may be about 125 gpm.

Another aspect of the ring 210 is shown in FIG. 3. It may be observed that the outer (or first) pipe 102 is configured with a large-area section, such as a large-cross-sectional area section 232 that is spaced (in the direction 208 of the axis of the pipes 102 and 104) from the inner (or second) pipe 104. Also, the outer pipe 102 and the inner pipe 104 in the telescopic relationship define a small-area section 233 surrounding the inner (second) pipe 104 and inside the first (outer) pipe 102. The member 200, in the form of the ring 210, for example, may be positioned in the large-area section 232.

Figure 4A:
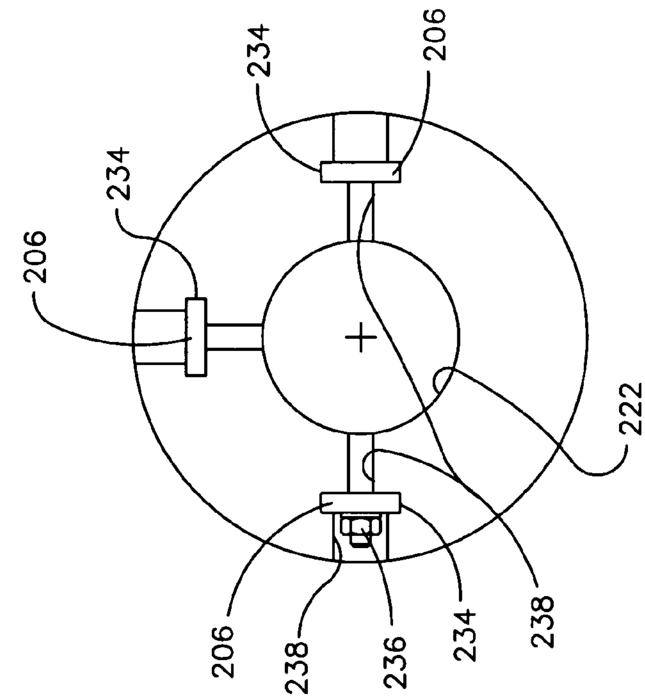
FIG. 4A is an enlarged elevational end view of the ring.
Figure 4B:
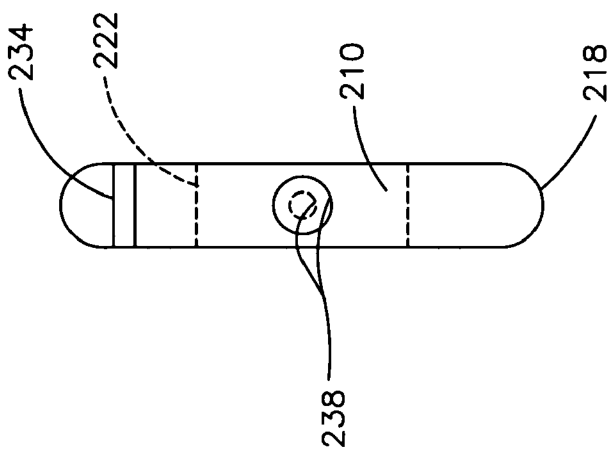
FIG. 4B is a cross-sectional side view of the ring.

FIG. 4A is an enlarged elevational end view of the ring 210, and FIG. 4B is a cross-sectional side view of the ring 210. FIG. 4A shows the configuration of the ring 210 as including slots 234 extending completely through the ring 210 (e.g., in the direction 208). The slots 234 are shown arranged at ninety degree intervals, or spaces, with three slots being shown. FIG. 4B shows one of the slots 234 configured to allow one of the arms 206 (FIG. 3) to extend through the ring 210. FIG. 4A shows an arm 206 attached to the ring 210 by a bolt/nut fastener 236. FIGS. 4A and 4B show bolt holes 238 drilled radially into the ring 210 to receive the fastener 234. The ring 210 is also shown provided with the opening 222.

Figure 5:
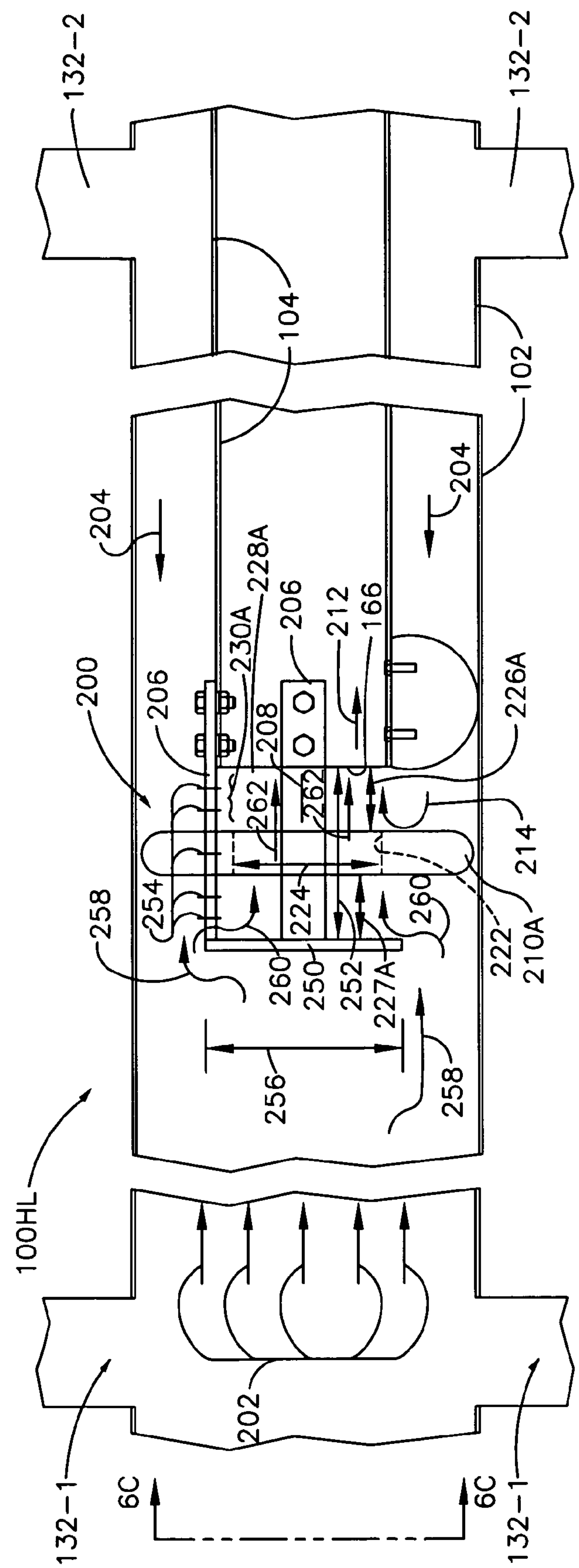
FIG. 5 also shows another embodiment of the flow control member configured as a flow balancing ring and a flow block disk.

FIG. 5 also shows another embodiment of the member 200 configured as a flow balancing ring 210A and a flow block disk 250 that are carried by the arms 206 in a manner that permits adjustment of the length (here referred to as "226A") and adjustment of a length 227A, while the flow block disk 250 remains in a fixed position relative to the inlet end 166, e.g., at a fixed length 252 relative to the inlet end 166. The "A" of the various reference numbers (e.g., 210A) indicates the adjustable feature, e.g., that the ring 210A is so adjustable. The lengths 226A and 227A may be measured to the center of the ring 210A.

Except for the addition of the flow block disk 250 and the adjustable feature of the ring 210A, the configuration, mounting, and operation of the ring 210A are the same as that of the ring 210 described above. FIG. 5 shows the arms 206 configured with many holes (indicated by center lines 254) to enable the ring 210A to be secured by the fastener 236 to the arms 206 so as to vary the lengths 226A and 227A. In the following description, an "A" used with a previous reference number also indicates that the item is adjustable. In use, in the event that the flow of the collectant (or other) conditions change in the basin 150, for example, in maintenance operations in which access to the system 100HL is provided, the fastener 236A may be placed in different holes 254 to adjust the lengths 226A and 227A.

The flow balancing ring 210A and the flow block disk 250 are configured to reduce the above-described difference in the head losses along the first path 202 and the second path 204. In another sense, the flow balancing ring 210 and the flow block disk 250 are configured to balance the flow of collectant from the header 132-1 along the first path 202 and from the header 132-2 along the second path 204. Ideally, by the action of the flow balancing ring 210 and the flow block disk 250 to achieve such balance, the flow of collectant into the header 132-1 (and along the first path 202) equals the flow into the header 132-2 (and along the second path 204). In actual practice, by the action of the flow balancing ring 210 and the flow block disk 250, such flow of the collectant along the first path 202 may be about ten percent (10%) more than the flow of the collectant along the second path 204. However, this maximum ten percent difference does not result in a build-up (at the bottom 152 of the basin 150) of objectionable thicknesses of the sludge at one end of the basin as compared to the thickness of the sludge at the other opposite end of the basin.

The configurations of the flow balancing ring 210A and of the flow block disk 250 reduce the difference in such head losses along the first path 202 and along the second path 204, and obtain such balancing of the flow of collectant along the first path 202 and the second path 204, as follows. As noted above, the ring 210A may be positioned by the arms 206 in the outer pipe 102 with the position provided by a selected length 226A and a selected length 227A in the direction 208 of the axis of the pipes 102 and 104. This provides a desired configuration of the entry 230A to the space 228A and to the inlet end 166 of the inner pipe 104. FIG. 5 shows the flow block disk 250 secured to the arms 206, as by welding or other fastener, to provide the fixed length 252 between the inlet end 166 and the disk 250. The diameter 256 of the disk 250 is selected in conjunction with selection of the diameter 224 of the opening 222 of the ring 210A, and of the lengths 226A and 227A. In practice, with an outer pipe 102 having an exemplary eight inch diameter, used with an inner pipe 104 having an exemplary four inch diameter, a typical exemplary diameter of the flow block disk 250 may be about four inches, a typical exemplary diameter of the outer surface 218 of the ring 210 may be about 7.8 inches, an exemplary diameter of the opening 222 may be about 3.5 inches, and exemplary length 226A of the space 228A and exemplary length 227A (between the disk 250 and the center of the ring 210A) may be about two inches and three inches respectively. The factors that may influence the selection of the exact diameters of the disk 250 and of the opening 222, and of the exact lengths 226A and 227A include those identified above, as well as the effect of the flow block disk 250 on the flow of the collectant in the path 202 from the first header 132-1 to the inlet end 166.

As described above, without the ring 210, and in this embodiment of FIG. 5 without the ring 210A and without the added flow block disk 250, there is the tendency for the amount of collectant flowing in the second path 204 to be substantially less than the amount of collectant flowing in the first path 202. This tendency results in the difference between the flow of the collectant along the second path 204 and the first path 202. The desired reduction of the difference between such flows may be achieved by selecting the diameter 256 of the flow block disk 250, the distances 226A and 227A, and the diameter 224 of the opening 222 in the ring 210A, for example. The larger the diameter of the opening 222, and the greater the length 227A of the separation of the disk 250 and the ring 210A in the direction 208 of the axis, the less the head loss will be reduced from a value occurring without the ring 210A and without the disk 250, and the more collectant will flow along the first path 202 into the inlet end 166 as compared to the flow along the second path 204 into the inlet end 166. In an opposite sense, with a longer length 226A of the space 228 and a corresponding shorter length 227A, there will be less separation of the disk 250 and the ring 210A in the direction 208 of the axis, there will be more flow of the collectant along the second path 204 into the inlet end 166 (see arrows 214 and 212) as compared to less flow along the first path 202 via radial paths 258 (outward) and 260 (inward) into the opening 222 and then via a path 262 into the inlet end 166.

Figure 6A:
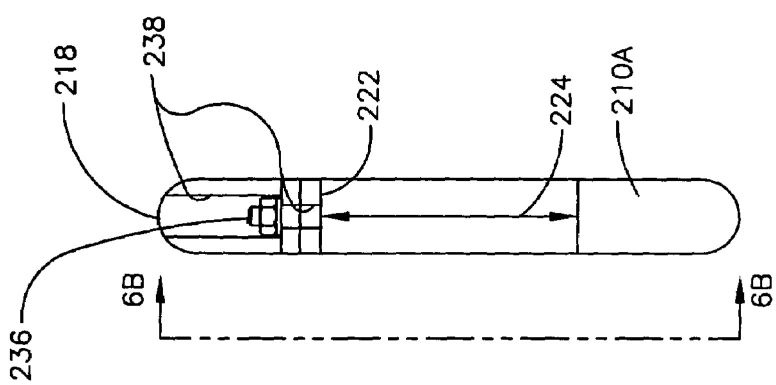
FIG. 6A is an enlarged side elevational view of the ring.
Figure 6B:
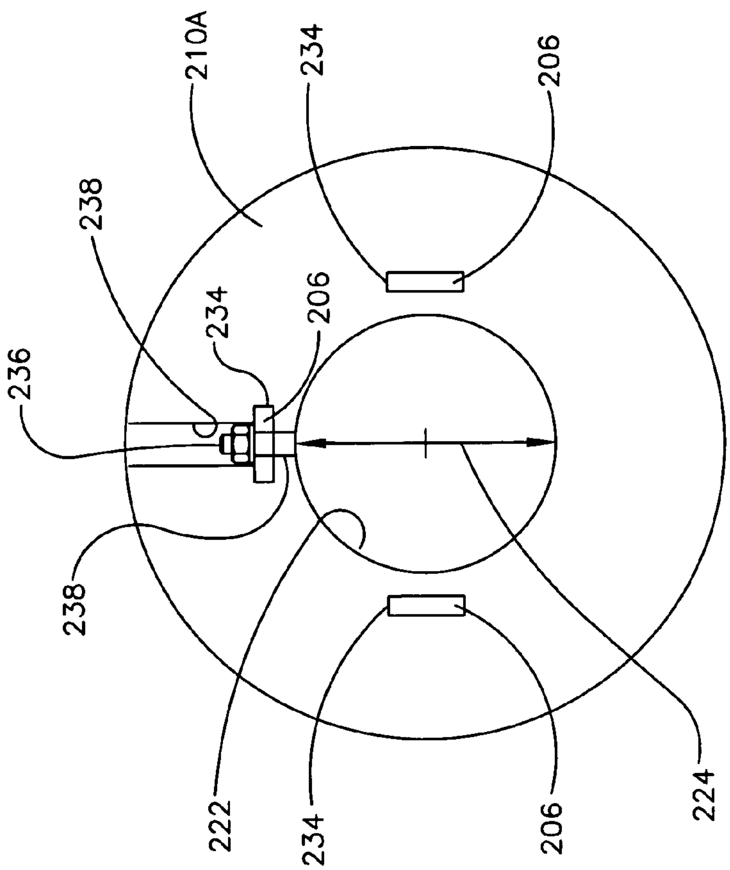
FIG. 6B is an end view of the ring, illustrating a ninety degree spacing of slots provided completely through the ring.

FIG. 6A, an enlarged side elevational view of the ring 210A, shows the bolts holes 238 in the ring 210A. FIG. 6B, an end view of the ring 210, shows the configuration of the ring 210A as including the ninety degree spacing of the slots 234 provided completely through the ring 210A for receiving the arms 206. One arm 206 may be attached to the ring 210 by the fastener 236 (FIG. 4A) that extends through the selected hole 238 to select the length 226A. FIGS. 6A and 6B show the fastener 236 inserted into bolt holes 238. The ring 210A is also shown provided with the opening 222 having the diameter 224.

Figure 6C:
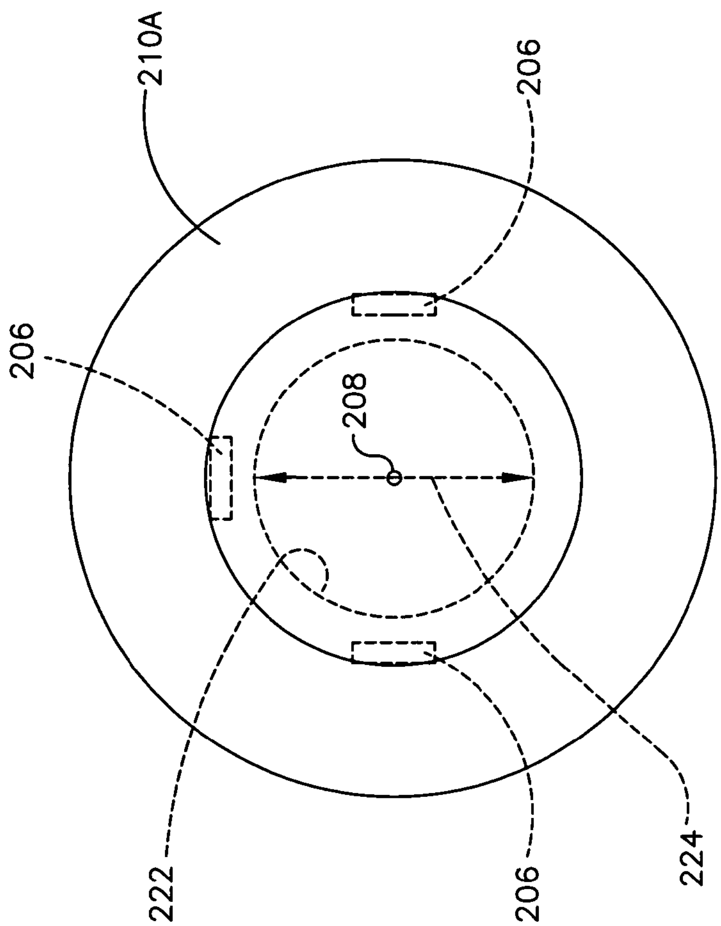
FIG. 6C is an end view of the flow block disk, illustrating the diameter of the disk and arms supporting the disk.

FIG. 6C is an end view of the flow block disk 250, illustrating the diameter 256 and the arms 206A (in dashed lines). The ring 210A is shown behind the disk 250. The blockage effect by the disk 250 on the path 202 is shown in FIG. 5 as a blockage of the central part of the path 202 within the outer pipe 102, such that diverted radial (outward) paths 258 curve outwardly around the disk 250. FIG. 5 also illustrates the blockage effect of the ring 210A on the path 202 and on the paths 258. This blockage is by the annular portion of the ring 210A, and is a blockage of the outer part of the path 202 within the outer pipe 102, and of the diverted paths 258. FIG. 5 also shows the opening 222 of the ring 210 effective to develop the radially inwardly extending collectant flow paths 260 around the rear of the disk 250 and into the opening 222 of the ring 210A. The extension of the flow paths 260 beyond the ring 210A and in the space 228A are referred to as the paths, or collectant flow paths, 262, which enter the inlet end 166 of the inner pipe 104.

The described configurations of the flow balancing ring 210A and the flow block disk 250 reduce the above-described difference in the head losses along the respective first path 202 and second path 204. In more detail, the creation of the diverted flow paths 258, in conjunction with the creation of the radial flow paths 260 through the adjustable length 277A, introduce a head loss in the flow 202. Such head loss in the flow 202 occurs at the same time as an adjustment in the flow 204 resulting from the selection of the size of the entry 230A, which is based on the length 226A between the ring 210A and the inlet end 166 of the inner pipe 104. Such adjustment in the flow 204 results in an effective reduction of the head loss in the path 204, such that the above-described balance may be achieved in the amount of the collectant collected by the first and second headers 132-1 and 132-2 respectively.

Figure 7A:
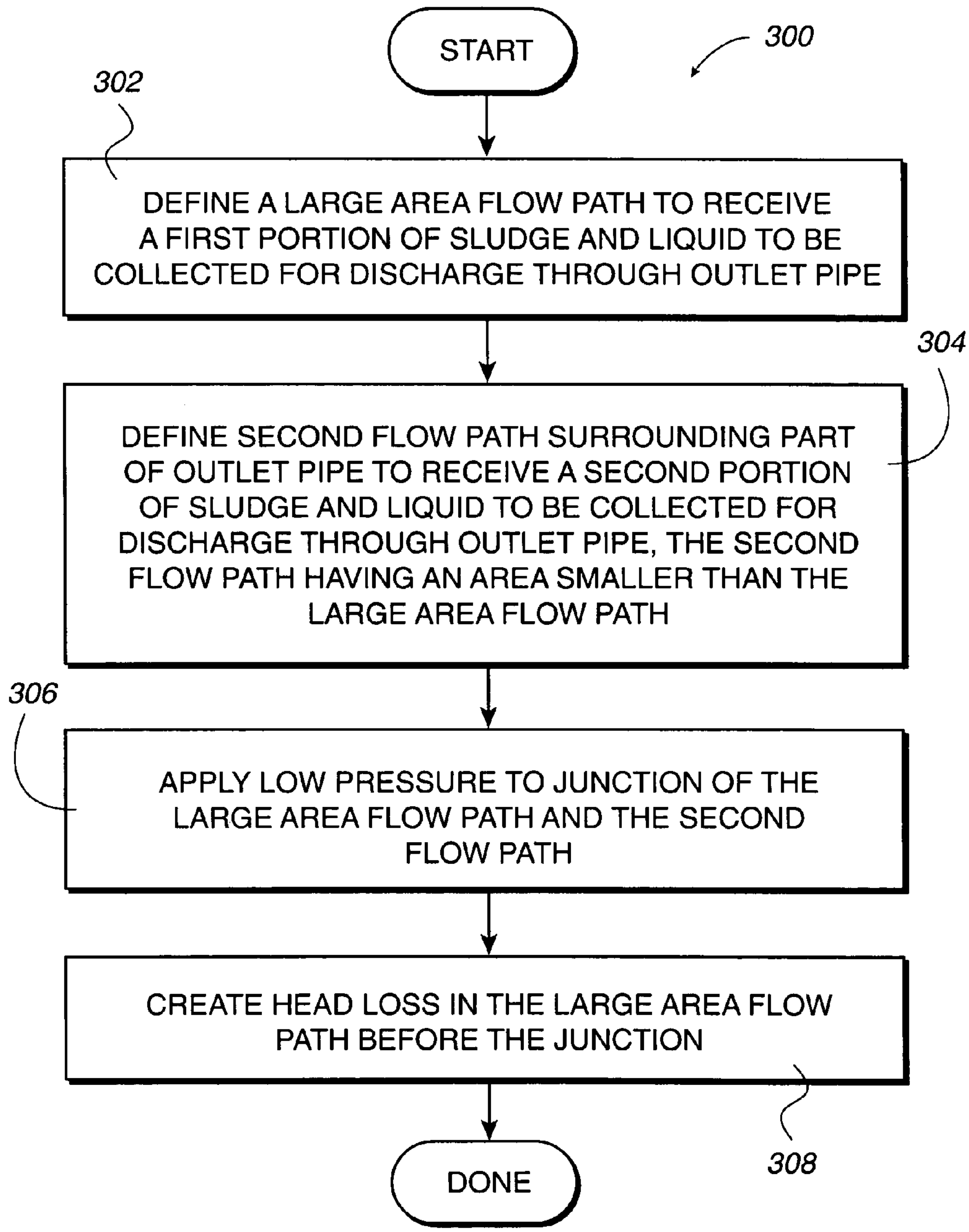
FIGS. 7A and 7B are flow charts describing operations of processes of the present invention for causing a head loss in a flow of collectant flowing to an inlet end of an inner pipe of a telescopic arrangement of pipes.

FIG. 7A shows a flow chart 300 illustrating a method aspect of the present invention. The method starts with an operation 302 of defining a large area flow path, such as the flow path 202, to receive a first portion of sludge and liquid to be collected for discharge through an outlet pipe, such as the inner pipe 104. The method moves to an operation 304 of defining a second flow path, such as the flow path 204, which is shown in FIG. 3 surrounding part of the outlet pipe, such as the inner pipe 104. The inner pipe 104 receives a second portion of sludge and liquid to be collected for discharge through the outlet pipe, such as the inner pipe 104. The second flow path 204 is configured with an area smaller than the area of the large area flow path 202. The method moves to an operation 306 of applying low pressure to a junction of the large area flow path 202 and the second flow path 204, which junction corresponds to the space 228 (FIG. 3), for example. The defining operations 302 and 304 may, for example, configure the flow paths 202 and 204 so that the junction (space 228) is at an inlet to the outlet pipe, which corresponds to the end 134 (FIG. 2A) of the inner pipe 104. The method moves to an operation 308 of creating a head loss in the large area flow path 202 before the junction, i.e., before the space 228. It may be understood that the head loss is thus located between the flow member 200 and the header 132-1 (FIG. 3). The method is then DONE.

The method shown in FIG. 7A may include operational details such as the following. The large area flow path defining operation 302 may configure the large area flow path 202 with an upstream pathway adjacent to the header 132-1. This pathway is between the junction (at the space 228) and the header 132-1, which may define a first inlet that receives the first portion of the sludge and liquid to be collected. The creating operation 308 may create the head loss in such upstream pathway between the junction (space 228) and the first inlet (header 132-1).

In addition, the method of flow chart 300 may comprise the second flow path defining operation 302 configuring the second (small area) flow path 204 with the upstream pathway between the junction (space 228) and a second inlet, which may be the second header 132-2 that receives a second portion of the sludge and liquid to be collected. As described above, the head loss tends to substantially balance separate flows of the sludge and liquid to the outlet pipe (inner pipe 104), which separate flows are to the first flow path 202 from the first inlet (header 132-1) and to the second flow path 204 from the second inlet (header 132-2).

In addition, the method of flow chart 300 may comprise the head loss in the upstream pathway between the junction (space 228) and the inlet (header 132-1) reducing the flow of the sludge and liquid in the large area flow path 202. It may also be understood that the method of flow chart 300 may comprise the creating operation 308 placing a flow controller, such as the member 200 in the form of the ring 210 (FIG. 3) or the flow block disk 250 and the ring 210A (FIG. 5) in the large area flow path 202. The creating operation 308 may be understood then, as configuring such flow controller (e.g., member 200) with structure to partially block the large area flow path 202, wherein the structure may be the ring 210 further configured with an opening (e.g., the opening 222) for directing the partially blocked first flow path 202 into the outlet pipe (the inner pipe 104). As noted, alternately, the creating operation 308 may further comprise configuring the flow controller (member 200) with a central member, such as the disk 250, to divert a first flow 258 in the large area flow path 202 outwardly, and further configuring the flow controller 200 with an annular member, such as the ring 210, downstream of the central member 250 to divert the diverted first flow 258 inwardly, or radially, (see flow 260) and into the outlet pipe (see arrow 262).

In addition, the large area flow path defining operation 302 of the method of flow chart 300 may be described as configuring the large area flow path 202 with the upstream pathway between the junction (space 228) and the first inlet (end 134, FIG. 2A) that receives the first portion of the sludge and liquid to be collected. The creating operation 308 may be considered as creating the head loss in that upstream pathway between the junction and the first inlet. The head loss tends to substantially balance the separate flows of the sludge and liquid to the outlet pipe (inner pipe 104) from the first inlet (header 132-1) and from the second inlet (header 132-2). Thus the method contemplates that the head loss in the upstream pathway between such junction and such inlet reduces the flow of the sludge and liquid in the large area flow path 202.

Figure 7B:
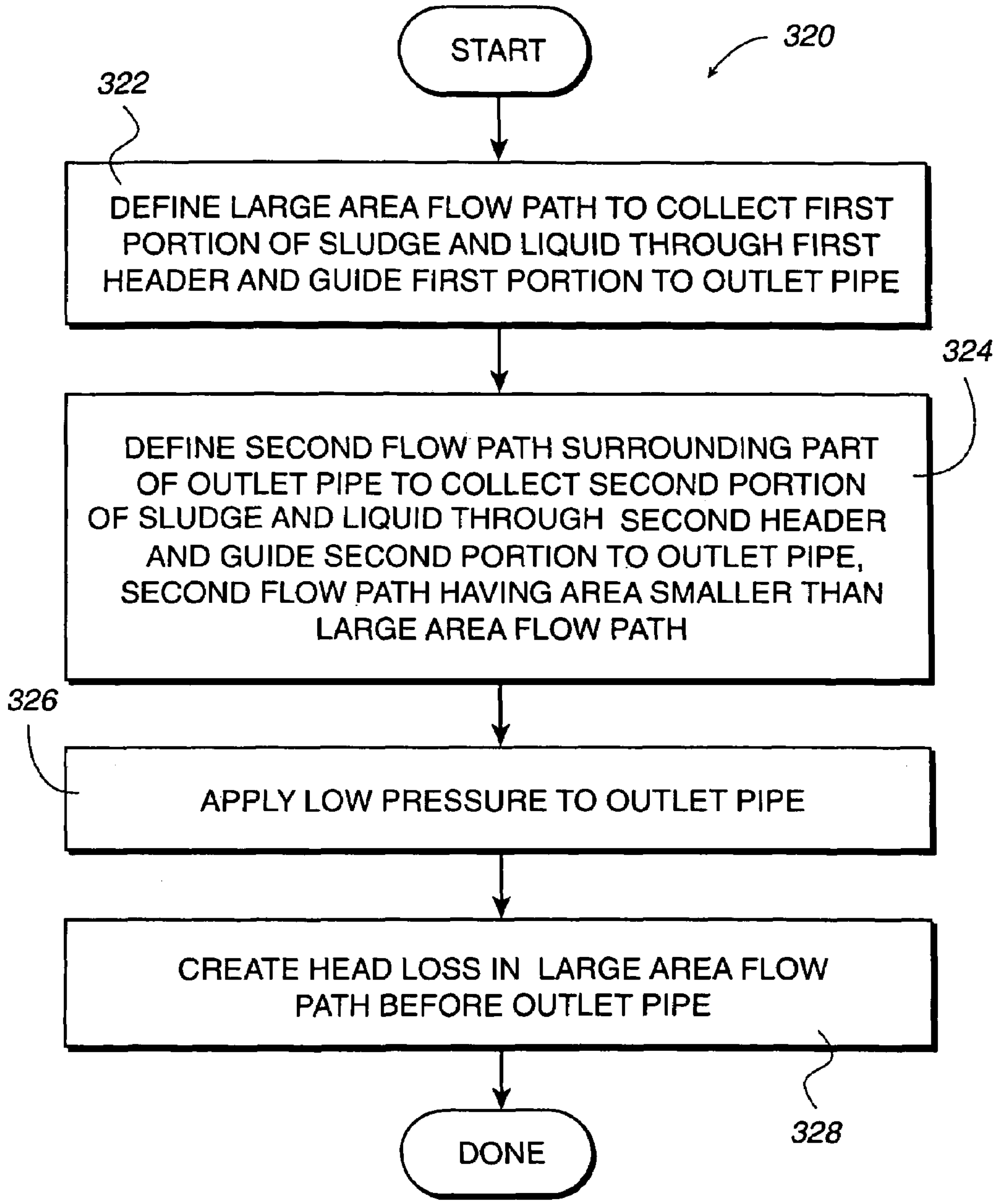

FIG. 7B shows a flow chart 320 illustrating another embodiment of a method aspect of the present invention. The method starts with an operation 322 of defining a large area flow path, such as the flow path 202, to collect the first portion of sludge and liquid through the first header (132-1) and to guide the first portion to outlet pipe (inner pipe 104). The method moves to an operation 324 defining the second flow path 204 surrounding part of outlet pipe (pipe 104) to collect the second portion of sludge and liquid through the second header 132-2 and guide the second portion to the outlet pipe (inner pipe 132-2). The second flow path 204 has an area smaller than the large area flow path 202. The method moves to an operation 326 to apply a low pressure to the outlet pipe (inner pipe 104). The method moves to an operation 328 to create the head loss in the large area flow path 202 before the outlet pipe (inner pipe 104). The method is then DONE.

The method shown in FIG. 7B may include operational details such as the following. The operation 328 of creating the head loss in the large area flow path 202 before the outlet pipe (inner pipe 104) may be understood as reducing the tendency of the first portion (the flow through the header 132-1) to be greater than the flow through the second portion (the flow through the header 132-2). Also, the reducing of the tendency of the first portion to be greater than the second portion tends to balance the amount of the sludge and liquid collected through the first and second headers 132-1 and 132-2 respectively.

Also, the operation 328 of creating the head loss may be understood as comprising creating a serpentine flow of the sludge and liquid in the large area flow path 202. The serpentine flow discharges into the outlet pipe (inner pipe 104) as the flow 212 (FIG. 5). The serpentine flow may be understood by reference to FIG. 5, for example, which shows the flow path 202 diverted outwardly to form the flow path 258, which in turn flows inwardly (radially) as the flow path 260 flowing through an opening defined by the distance 227A, and then laterally as the flow path 262 which flows into the flow path 212 into the inner pipe 104. The successive paths 202, 258, 260, 262 and 212 define the serpentine flow.

It may be understood, then that the system 100HL of the present invention retains an ability to meet all of the above-described needs of the parent invention by providing a way of significantly increasing the flow rate through the headers 132 that collect the sludge and liquid without causing the above-described problems in priming the sludge collection system 100HL. This results from the telescopic pipes 102 and 104 staying in a line of the axial direction 112 adjacent to the bottom 152, and thus not floating upwardly into or against the bottom 172 of the equipment 170 (FIG. 2A), for example. The system 100HL of the present invention also provides the described way of achieving such sludge collection, while having an easily primed collection system.

The way of significantly increasing the flow rate through the header 132 that collects the material and the liquid from the bottom 152 is by using the telescopic pipes 102 and 104, which define a larger-diameter pipe assembly connected to the headers 132 than the prior flexible hoses. The way of avoiding the problems in priming the sludge collection system 100HL is by making this telescopic pipe system 100HL (that forms the larger-diameter pipe assembly) rigid so that it is not free to rise (float) above the level of the headers 132 or the outlet end 168 of the inner pipe 104 in the basin 150.

It may be further understood, then, that the system 100HL of the present invention further meets all of the additional needs described above. This is by not only providing a way of retaining the advantages of the telescopic pipe arrangement of the parent application, and having the additional advantages of allowing collection of the sludge simultaneously from many locations (or headers 132 movable) along the floor 152 of the basin 150, and without having moving parts in addition to the movement of the one pipe 102 relative to the other pipe 104, but by also providing a way to assure the balanced flow of sludge and liquid through both header pipes 132. Also, again without having such moving parts, the present invention provides a way of obtaining a higher ratio of sludge to liquid collected by the telescopic arrangement. Further, again without having such moving parts, the present invention provides a way to avoid sludge build-up near one end of the basin 150 as compared to the sludge near the other end.

The way the system 100HL of the present invention meets all of the above needs while retaining the advantages of the telescopic pipe arrangement of the parent application, and while having the additional advantages of allowing collection of the sludge simultaneously from many locations along the floor 152 of the basin 150, and without having such moving parts, is to provide the method of the present invention which may be performed by the member 200 (also referred to as a controller or flow controller) to provide the flow balancing. The balancing may be accomplished by the one ring 210, or by the ring 210A with the flow block disk 250. The flow that is balanced is the separate flow of the collectant that enters each of the headers, and the balancing renders such flow through one of the headers relatively the same as the flow through the other of the headers, as described above with respect to the above ideal and in practice examples.

An aspect of the balanced flow relates to configuring the member 200 relative to the diameter of the outer pipe 102 of the two pipes 102 and 104 in the telescopic pipe arrangement of the parent application. This is done by configuring the outer diameter of the surface 218 of the ring 210 to be almost the same diameter as the diameter of the outer pipe 102.

Another aspect of the balanced flow relates to configuring the member 200 to be selectably positioned relative to the inlet, or entrance, end 166 of the inner pipe 104. A still other aspect of the balanced flow relates to configuring the member 200 with the opening 222 for admitting and controlling the flow 202 from the header 132-1 into the inlet end 166 of the inner pipe 104.

A yet another aspect of the balanced flow relates to configuring the member 200 with the ring 210A and the disk 250, which may include the cooperation of the ring 210A and the disk 250 for providing the head loss in the flow 202 via the radial flow 260, for example, and the resulting balanced flows 202 and 204.

Although the foregoing has been described in some detail for purposes of clarity or understanding, it will be appreciated that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for removing sludge from a basin, the system comprising:

an outlet pipe configured with an inlet to receive the sludge and direct the sludge out of the basin;

a header mount pipe surrounding the inlet and at least a portion of the outlet pipe, the header mount pipe carrying first and second headers spaced along the header mount pipe for receiving the sludge from the basin and directing the sludge into the header mount pipe for discharge through the inlet of the outlet pipe; and a member in the header mount pipe adjacent to the inlet between the first and second headers, the member being positioned in a first path of the sludge flowing in the header mount pipe from the first header, the member being positioned in a second path of the sludge flowing in the header mount pipe from the second header.

2. A system as recited in claim 1, wherein the member comprises:

at least one arm cantilevered from the outlet pipe and extending past the inlet in a direction of an axis of the header mount pipe; and a flow balancing ring carried by the at least one arm and extending perpendicular to the axis to direct the first path into the inlet and redirect the second path into the inlet.

3. A system as recited in claim 2, wherein the ring is configured with an orifice, wherein the member further comprises:

a disk mounted on the at least one arm and blocking a direct flow of the sludge from the first flow path into the orifice to cause a head loss in the first path.

4. A system as recited in claim 2, wherein the at least one arm and the ring are configured to adjust the position of the ring relative to the inlet to balance a flow of the sludge in the first path and a flow of the sludge in the second path.

5. A system for collecting material, comprising:

a first rigid pipe;

a second rigid pipe configured with an entrance end;

the first and second pipes being in telescopic relationship one received within the other so that the entrance end is within the first rigid pipe;

at least two header pipes secured to and spaced along the first rigid pipe, the at least two header pipes being first and second header pipes each having at least one opening through which to collect the material, each of the header pipes defining a header conduit extending from the at least one opening to the first rigid pipe;

wherein the first rigid pipe directs the material to and through the entrance end into the second rigid pipe; and a controller secured to the second rigid pipe adjacent to the entrance end in the way of amounts of the material directed from the respective first and second header pipes into the second rigid pipe.

6. A system for collecting material as recited in claim 5, wherein:

the first rigid pipe comprises a large-area section spaced from the second rigid pipe and a small-area section surrounding the second rigid pipe; and the controller is positioned in the large-area section.

7. A system for collecting material as recited in claim 5, wherein:

the controller is positioned in the first rigid pipe and is configured to extend substantially fully across a cross-sectional area of the first rigid pipe, the controller being further configured with an opening configured to permit the material directed from the first header pipe to flow through the opening and into the second rigid pipe.

8. A system for collecting material as recited in claim 7, wherein the controller is positioned in the first rigid pipe spaced by a selected distance from the second rigid pipe to permit the material directed from the second header pipe to flow around the entrance end and into the second rigid pipe without flowing past the controller.

9. A system for collecting material as recited in claim 8, wherein:

the configuration of the opening and the distance have respective values selected to balance the amount of material directed from the respective first header pipe through the opening and into the second rigid pipe and the amount of material directed from the second header pipe and flowing around the entrance end and into the second rigid pipe.

10. A system for collecting material as recited in claim 9, wherein:

the controller comprises a disk secured to the second rigid pipe spaced from the entrance end and located centrally in the first rigid pipe in the way of amounts of the material directed from the first header pipe into the second rigid pipe, the disk allowing the amounts of the material to flow around the disk and into the second rigid pipe.

11. A system for collecting material as recited in claim 10, wherein:

the controller further comprises an annularly-shaped ring between the disk and the entrance end, the ring being provided with a central opening for receiving the material flowing around the disk and allowing the material to flow into the entrance end.

12. A system for collecting material as recited in claim 11, wherein:

the annularly-shaped ring is adjustably positioned between the disk and the entrance end.

13. A system for collecting material as recited in claim 12, wherein:

in an adjusted position, the annularly-shaped ring is positioned relative to the entrance end so that the ring and the disk introduce a head loss in the flow of the material directed from the first header pipe into the second rigid pipe.

14. A system for collecting material as recited in claim 12, wherein:

adjustment of the position of the annularly-shaped ring relative to the entrance end and to the disk balances the amount of material directed from the respective first header pipe into the second rigid pipe and the amount of material directed from the second header pipe into the second rigid pipe.

15. A system for collecting material as recited in claim 12, wherein:

adjustment of the position of the annularly-shaped ring relative to the entrance end and to the disk reduces a difference between a value of a flow of material directed from the respective first header into the second rigid pipe and a value of a flow of material directed from the second header into the second rigid pipe.

16. A system for collecting material, comprising:

a first rigid pipe configured with an internal wall;

a second rigid pipe, the second rigid pipe being configured with an open inlet entrance;

the first and second pipes being in telescopic relationship with at least the open inlet entrance of the second pipe received within the internal wall of the first pipe;

at least two header pipes secured to the first pipe, the at least two header pipes comprising first and second header pipes each having at least one opening through which to collect the material, each of the two header pipes defining a header conduit extending from the at least one opening to the interior of the first rigid pipe; and an annular-shaped member mounted in the first rigid pipe between the first and second header pipes spaced from the open inlet entrance and adjacent to the internal wall of the first rigid pipe.

17. A system for collecting material as recited in claim 16, wherein:

a portion of the first rigid pipe surrounds the second rigid pipe; and the annular-shaped member is configured so that as-mounted in the first rigid pipe spaced from the open inlet entrance and adjacent to the internal wall of the first rigid pipe a flow of the material in the first rigid pipe to the open inlet entrance is balanced, the balanced flow comprising a first flow from the first header pipe only in the first rigid pipe and a second flow from the second header pipe and through the portion of the first rigid pipe that surrounds the second rigid pipe.

18. A system for collecting material as recited in claim 16, wherein:

the annular-shaped member is configured with a central opening for receiving a flow of the material flowing from the first header pipe only in the first rigid pipe.

19. A system for collecting material as recited in claim 16, wherein:

the first rigid pipe is provided with a first area extending radially across the first rigid pipe and with a portion that surrounds the second rigid pipe; and the annular-shaped member is configured with a central flow passage and a member area extending radially from the central flow passage and in the first rigid pipe to block a flow along the first rigid pipe, the blocked flow being from the second header pipe and through the portion of the first rigid pipe that surrounds the second rigid pipe and into the open inlet entrance.

20. A system for collecting material as recited in claim 16, wherein the annular-shaped member is configured with a central flow passage, the system further comprising:

a disk mounted in the first rigid pipe spaced from the annular-shaped member and configured to cause a head loss in a flow of the material into the central flow passage.

21. A system for collecting material as recited in claim 16, the system further comprising:

arms mounted on the second pipe and adjustably mounting the annular-shaped member in the first pipe relative to the open inlet entrance.

22. A system for collecting material as recited in claim 21, wherein the arms are configured to adjust a distance between the annular-shaped member and the open inlet entrance so that a flow of the material in the first rigid pipe to the open inlet entrance is comprised of balanced first and second flows, the first flow being from the first header pipe only in the first rigid pipe and the second flow being from the second header pipe and through a portion of the first rigid pipe that surrounds the second rigid pipe.

23. Apparatus for collecting sludge and liquid for discharge through an outlet pipe, the apparatus comprising:

a first pipe configured to define a large flow path having a large area value having a first inlet to receive a first portion of the sludge and liquid to be collected for discharge through the outlet pipe;

the first pipe being further configured to define a second flow path surrounding at least a part of the outlet pipe and having a second inlet to receive a second portion of the sludge and liquid to be collected for discharge through the outlet pipe, the second flow path having an area having a value less than the large area value;

a pump for applying a low pressure to a junction of the large flow path and the second flow path; and a flow controller for creating a head loss in the large flow path before the first portion of the sludge and the liquid received in the large flow path flow to the junction.

24. Apparatus as recited in claim 23, wherein:

the large flow path configured with the large area value is further configured with an upstream pathway between the junction and the first inlet that receives the first portion of the sludge and liquid to be collected; and the flow controller creates the head loss in the upstream pathway between the junction and the first inlet.

25. A method as recited in claim 24, wherein:

the head loss in the upstream pathway between the junction and the first inlet reduces a flow of the sludge and the liquid in the large flow path.

26. Apparatus as recited in claim 23, wherein:

the first pipe is further configured with an upstream pathway between the junction and the second inlet that receives the second portion of the sludge and liquid to be collected; and the head loss tends to substantially balance separate flows of the sludge and liquid to the outlet pipe from the first inlet and from the second inlet.

27. Apparatus as recited in claim 23, wherein:

the outlet pipe has an inlet; and the first pipe configures the respective large and second flow paths so that the junction is at the inlet to the outlet pipe.

28. Apparatus as recited in claim 23, wherein:

the flow controller is received in the large flow path.

29. Apparatus as recited in claim 28, wherein:

the flow controller is configured with structure to partially block the large flow path, and the structure is further configured with an opening for directing the partially blocked large flow path into the outlet pipe.

30. Apparatus as recited in claim 28, wherein:

the flow controller is configured with a central member to divert a first flow in the large flow path outwardly, and the flow controller is further configured with an annular member downstream of the central member to divert the diverted first flow inwardly and into the outlet pipe.

* * * * *